US007796995B2

(12) United States Patent
Gill et al.

(10) Patent No.: US 7,796,995 B2
(45) Date of Patent: Sep. 14, 2010

(54) ASYNCHRONOUS SIGNALING AND DATA DELIVERY IN WIRELESS COMMUNICATION SYSTEM

(75) Inventors: Harleen K. Gill, San Diego, CA (US); Ashu Razdan, San Diego, CA (US); Arulmozhi Kasi Ananthanarayanan, San Diego, CA (US); Eric C. Rosen, Solana Beach, CA (US)

(73) Assignee: QUALCOMM Incorporated, San Diego, CA (US)

( * ) Notice: Subject to any disclaimer, the term of this patent is extended or adjusted under 35 U.S.C. 154(b) by 35 days.

(21) Appl. No.: 11/156,176

(22) Filed: Jun. 17, 2005

(65) Prior Publication Data

US 2005/0288049 A1 Dec. 29, 2005

Related U.S. Application Data

(60) Provisional application No. 60/686,132, filed on May 31, 2005, provisional application No. 60/581,970, filed on Jun. 21, 2004.

(51) Int. Cl.
*H04W 72/00* (2009.01)
(52) U.S. Cl. .................. 455/450; 455/518; 455/521; 370/329
(58) Field of Classification Search .............. 455/450, 455/518, 521, 419; 370/329
See application file for complete search history.

(56) References Cited

U.S. PATENT DOCUMENTS

| 5,373,506 | A | * | 12/1994 | Tayloe et al. ................ 370/311 |
| 6,377,560 | B1 | | 4/2002 | Dailey |
| 6,456,604 | B1 | * | 9/2002 | Lee et al. .................... 370/328 |
| 6,519,472 | B1 | * | 2/2003 | Brennan et al. ............. 455/518 |
| 6,564,049 | B1 | * | 5/2003 | Dailey ......................... 455/416 |
| 6,714,795 | B1 | | 3/2004 | Long et al. |
| 7,013,129 | B2 | * | 3/2006 | Goss et al. ............... 455/414.1 |

(Continued)

FOREIGN PATENT DOCUMENTS

GB 2290196 12/1995

(Continued)

OTHER PUBLICATIONS

International Search Report PCT/US2005/022022, International Search Authority-EPO, Sep. 29, 2005.

(Continued)

*Primary Examiner*—Nghi H Ly
(74) *Attorney, Agent, or Firm*—Raphael Freiwirth

(57) ABSTRACT

A system and method for signaling and delivering group communication data, such as push-to-talk (PTT) setup data, to a dormant wireless telecommunication device across a control channel on a wireless communication network. Each wireless telecommunication device is able to direct a single group communication stream to a designated target group of other wireless telecommunication devices, and the wireless telecommunication device has a dormant state in which the wireless telecommunication devices bridges a control channel with a communication server and an active state in which the wireless telecommunication device bridges a dedicated communication channel with the communication server. The wireless telecommunication device receives group communication setup data though a control channel for incoming group communications, and such delivery occurring without fully bridging a dedicated communication channel to that wireless telecommunication device.

58 Claims, 7 Drawing Sheets

U.S. PATENT DOCUMENTS

| | | | |
|---|---|---|---|
| 7,024,203 B1 * | 4/2006 | Naghian | 455/453 |
| 7,113,797 B2 * | 9/2006 | Kelley et al. | 455/456.2 |
| 7,305,481 B2 * | 12/2007 | Blanchet et al. | 709/230 |
| 2002/0173325 A1 | 11/2002 | Rosen et al. | 455/518 |
| 2005/0265277 A1 * | 12/2005 | Thadasina et al. | 370/328 |

FOREIGN PATENT DOCUMENTS

| | | |
|---|---|---|
| WO | 04028191 | 12/1995 |
| WO | 02093948 | 11/2002 |
| WO | 99052236 | 11/2002 |
| WO | 04001619 | 12/2003 |

OTHER PUBLICATIONS

Written Opinion PCT/US2005/022022, International Search Authority-EPO, Sep. 29, 2005.

International Preliminary Examination Report - PCT/US2005/022022 - IPEA/US - Jan. 29, 2007.

* cited by examiner

ASYNCHRONOUS SIGNALING AND DATA DELIVERY IN WIRELESS COMMUNICATION SYSTEM

CROSS-REFERENCE TO RELATED APPLICATIONS

This application claims the benefit of U.S. Provisional Patent Application Ser. No. 60/581,970, filed on Jun. 21, 2004; and U.S. Provisional Patent Application Ser. No. 60/686,132, filed on May 31, 2005. The contents of these documents are incorporated herein by reference.

BACKGROUND OF THE INVENTION

1. Field of the Invention

The present invention generally relates to wireless telecommunications. More specifically, the present invention relates to a system and method for asynchronously signaling and delivering data to a dormant wireless telecommunication device in a synchronous paging cycle on a wireless telecommunication system.

2. Description of the Related Art

In a wireless network, the users of wireless communication devices communicate over an over-the-air interface to a central computer. This may be done directly, as in the case of a wireless LAN in an office environment, or it may be done through cellular infrastructure equipment, as in the case of a wireless telephone application. One type of personal communication system is a push-to-talk (PTT) system between mobile wireless communication devices. A PTT communication connection is typically initiated by a single button-push on the wireless device that activates a half-duplex link between the speaker and each member device of the group and once the button is released, the device can receive incoming PTT transmissions once the button is released. In some arrangements, the PTT speaker will have the "floor" where no other group member can speak while the speaker is speaking. Once the speaker releases the PTT button, any other individual member of the group can engage their PTT button and they will have the floor.

A specific PTT group of recipient wireless devices for the communicating wireless device is commonly set up by the carrier and the wireless devices themselves do not allow the modification of the group, i.e. to include or drop individuals from the group, or to purposely direct a communication to be received by any fewer members than the entire group. A PTT group can provide a dispatch voice service that operates over standard commercial wireless infrastructure, with communication between endpoints occurs within virtual groups, wherein the voice of one "talker" is broadcast to one or more "listeners." A single instance of this type of communication is commonly referred to as a dispatch call or simply a call. A call is an instantiation of a group, which defines the characteristics of a call. A group in essence is defined by a member list and associated information, such as group name or group ID. In the absence of a wireless multicast channel, each group is formed by the combination of separate point-to-point connections between each endpoint and group communication servers assigned to manage the call.

The typical PTT call involves two users who are rarely located within the same telecommunication sector such that communication and replication of the communication is propagated more easily over the existing telecommunication infrastructure. However, a small but very important fraction of push-to-talk calls involve a larger number of call participants, many of whom may also be located within the same sector; public-safety disaster scenarios are one example.

One problem arises in that a wireless telecommunication device may have to wait for a dedicated communication channel for the initial setup of a group communication, and such latency is readily apparent to the speaker and user. For wireless devices that are in a dormant state, i.e. no active broadcast channels, many systems periodically page the wireless device to make sure the system knows of the device's location, but such paging will be the next opportunity to push data out to the wireless devices and setup the PTT communication. It is thus to such a system and method that can reduce the latency for the setup of a PTT or direct group communication by setting up the group communication without waiting for the next page or setting up a dedicated channel that the present invention is primarily directed.

SUMMARY OF THE INVENTION

The present invention, in one aspect, is a system and method for signaling and delivering group communication data, such as push-to-talk (PTT) setup data, to a dormant wireless telecommunication device across a control channel from a communication server on a wireless communication network. The wireless telecommunication devices of the group are each able to direct a single group communication stream to a designated target set of other wireless telecommunication devices. These wireless telecommunication devices each have a dormant state in which the wireless telecommunication device bridges a continuous control channel with a communication server, and an active state in which the wireless telecommunication device bridges a dedicated communication channel with the communication server when needed. To speed group communication setup, the wireless telecommunication device receives group communication setup data though a control channel for incoming group communications, with such delivery occurring outside the synchronous pages or dedicated traffic channel from the communication server.

In one embodiment, there is provided a system for signaling and delivering data to a wireless telecommunication device on a wireless communication network including a plurality of wireless telecommunication devices wherein group communication-capable wireless telecommunication devices are able to direct a single group communication stream to a designated set of the plurality of wireless telecommunication devices. A group communication wireless telecommunication device further receives group communication setup data for incoming group communications to that wireless telecommunication device. The system also has a communication server that maintains communication with each of the plurality of wireless telecommunication devices through the at least one control channel, and the communication server periodically pages each dormant wireless telecommunication device of the plurality of wireless telecommunication devices to selectively bridge a dedicated communication channel, wherein upon desiring to open a dedicated broadcast channel to the wireless telecommunication device for a direct group communication to that wireless telecommunication device, the communication server sending at least group communication setup data across the control channel to a dormant wireless communication device prior to bridging a dedicated communication channel to that wireless telecommunication device.

In one embodiment, there is provided a communication server that maintains communication with a plurality of the wireless telecommunication devices wherein a set of the wireless telecommunication device are able to direct a single group communication stream to other members of the set of the plurality of wireless telecommunication devices, and each of the set of wireless telecommunication devices having a dormant state in which the wireless telecommunication device bridges at least one continuous control channel with a communication server and an active state in which the wireless telecommunication device bridges one or more dedicated communication channels with the communication server. The communication server periodically pages each dormant wireless telecommunication device of the plurality of wireless telecommunication devices and further sends group communication setup data for incoming group communications to each member of the set of wireless telecommunication devices when necessary. Upon desiring to open a dedicated broadcast channel to a dormant wireless telecommunication device for a direct group communication to that wireless telecommunication device, the communication server sends at least group communication setup data across the control channel to the dormant wireless communication device prior to bridging a dedicated communication channel to that wireless telecommunication device.

In one embodiment, there is provided a method for signaling and delivering data across a wireless telecommunication network from the communication server to the members of the set of wireless telecommunication devices, including the steps of bridging a control channel between the communication server and one or more dormant wireless telecommunication devices, periodically paging each of the dormant wireless telecommunication devices from the group communication server, and upon desiring to open a dedicated broadcast channel to the dormant wireless telecommunication device for a direct group communication to that wireless telecommunication device, the communication server sending at least group communication setup data across the control channel to a dormant wireless communication device prior to bridging a dedicated communication channel to that wireless telecommunication device. The bridged control channel can be a synchronous or asynchronous channel.

The system and method of the present invention can therefore start to setup the group communication without waiting for either a dedicated communication channel or the a periodic page to the dormant wireless device. The system and method can therefore minimize the initial latency for the group communication from the speaker to the user. Further, as long as the minimal data traffic is sent via the control channel, the use of the system and method will minimally affect the performance of the wireless telecommunication network.

Objects, advantages, and features of the present invention will become apparent after review of the hereinafter set forth Brief Description of the Drawings, Detailed Description of the Invention, and the claims.

DETAILED DESCRIPTION OF THE INVENTION

Figure 1:
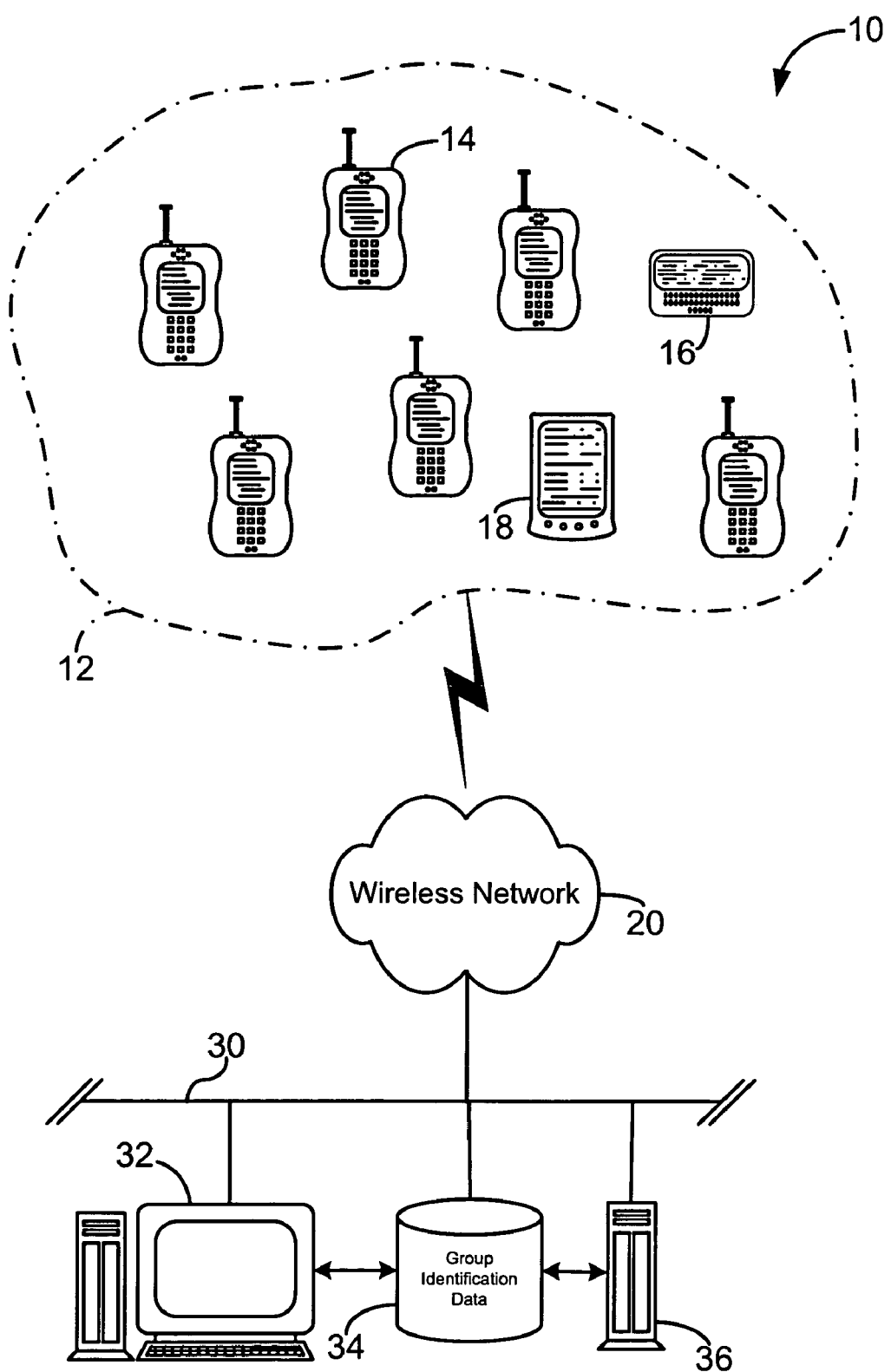
FIG. 1 is a representative diagram of a wireless network with a designated PTT group of wireless telecommunication devices communicating with a group communication server and other computer devices across the wireless network.

With reference to the figures in which like numerals represent like elements throughout, FIG. 1 illustrates one embodiment of a wireless telecommunication system 10 between a group of wireless telecommunication devices (target set 12) on a wireless network 20. Here, the one or more wireless telecommunication devices are in a PTT group, such as the wireless telephone 14, smart pager 16 and personal digital assistant (PDA) 18, with other wireless telecommunication devices across a wireless network 20. In the system 10, each wireless telecommunication device 14,16,18 is capable of selectively directly communicating across the wireless communication network 20 with a target set 12 of one or more other wireless telecommunication devices with the plurality. For example, the target set for cellular telephone 14 can all devices in the target set 12 or a subset thereof, such as pager 16 and PDA 18.

In particular, the system 10 can deliver media, such as voice data, multimedia, or other applicants, to very large push-to-talk (or other similar services) calls defined in ad-hoc fashion. These PTT calls can involve a very large number of call participants (several hundred) who can be scattered across an operator's wireless network 20 or who may all be located in a small number of sectors on the same network resources.

In one embodiment, a group communication server 32 selectively receives requests to bridge direct communications between the communicating wireless telecommunication devices 14,16,18 and the one or more other wireless telecommunication devices in the target set 12 designated for the communicating wireless telecommunication device. The communication server 32 then selectively bridges the requested direct communication, such as a PTT voice communication. The identity of the target set 12 is selectively available to the group communication server 32, such as being resident on the group communication server 32 or in a connected database 34, or possibly on another computer device, such as packet flow-control server 36 (as is common in network infrastructure).

Figure 8:
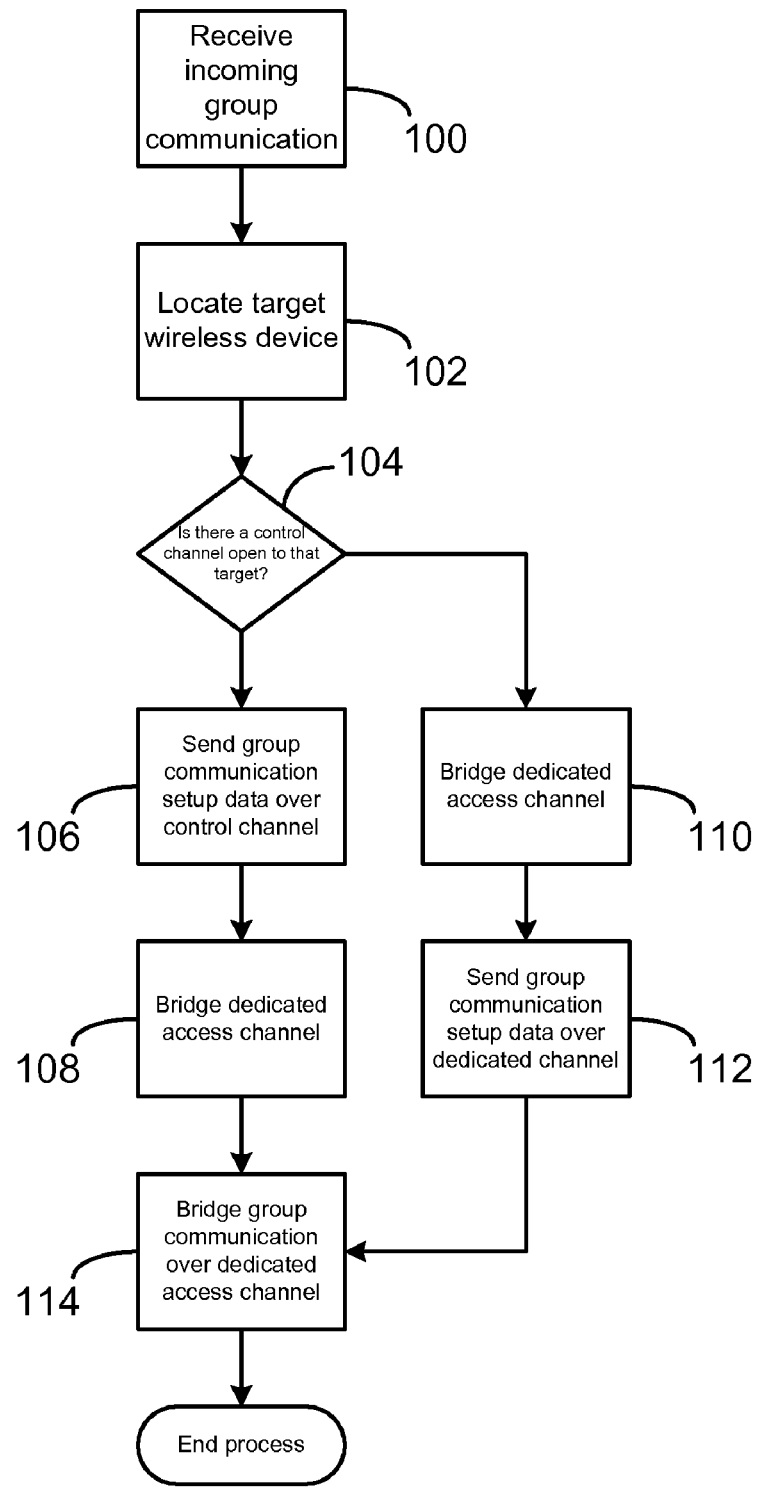
FIG. 8 is a call progress diagram illustrating the direct transmission of the data in a "DataOverSignaling" message over the control channel to a target wireless device (AT).

The system 10 allows the signaling and delivery of group communication data to a wireless telecommunication device 14,16,18 on a wireless communication network 20. In this embodiment, each wireless telecommunication device 14,16, 18 of the set 12 is able to direct a single group communication stream to a designated group of the set 12. As further described herein, each wireless telecommunication device 14,16,18 has a dormant state in which the wireless telecommunication device 14,16,18 bridges at least one continuous control channel with a communication server 32 and an active state in which the wireless telecommunication device 14,16, 18 bridges one or more dedicated communication channels with a communication server 32, such as traffic channel (TCH). The wireless telecommunication device 14,16,18 further receives group communication setup data for incoming group communications to the wireless telecommunication device 14,16,18, as shown in FIG. 8. The communication server 32 maintains communication with each of the set 12 of wireless telecommunication devices through the at least one control channel, and periodically pages each dormant wireless telecommunication device 14,16,18 of the set 12 to learn of the network location of that the wireless telecommunication device 14,16,18 and selectively bridge a dedicated communication channel if necessary. Upon desiring to open a dedicated broadcast channel to the wireless telecommunication device 14,16,18 for a direct group communication to that wireless telecommunication device 14,16,18, the communication server 32 sends at least group communication setup data across the control channel to a dormant wireless communication device prior to bridging a dedicated communication channel to that wireless telecommunication device 14,16,18 to bridge the group communication.

The communication server 32 should only send group communication setup data across the control channel only as sending other data, to include voice data, is very difficult to hand off to the dedicated communication channel once bridged. Thus, the communications server 32 sends group communication setup data to one or more of the set 12 of wireless telecommunication devices 14,16,18 across the control channel preferably prior to opening of the dedicated communication channel. While the communication server 32 can selectively send group communication setup data to one or more of the set 12 of wireless telecommunication devices 14,16,18 across the control channel, the communication server can also send group communication setup data to other wireless telecommunication devices of the set 12 through the next periodic page or at full bridging of the dedicated communication channel. The control channel can be an asynchronous control channel, i.e. periodically maintained between a base station 60 and wireless device, or can be a synchronous control channel, i.e. continuously maintained.

Figure 2:
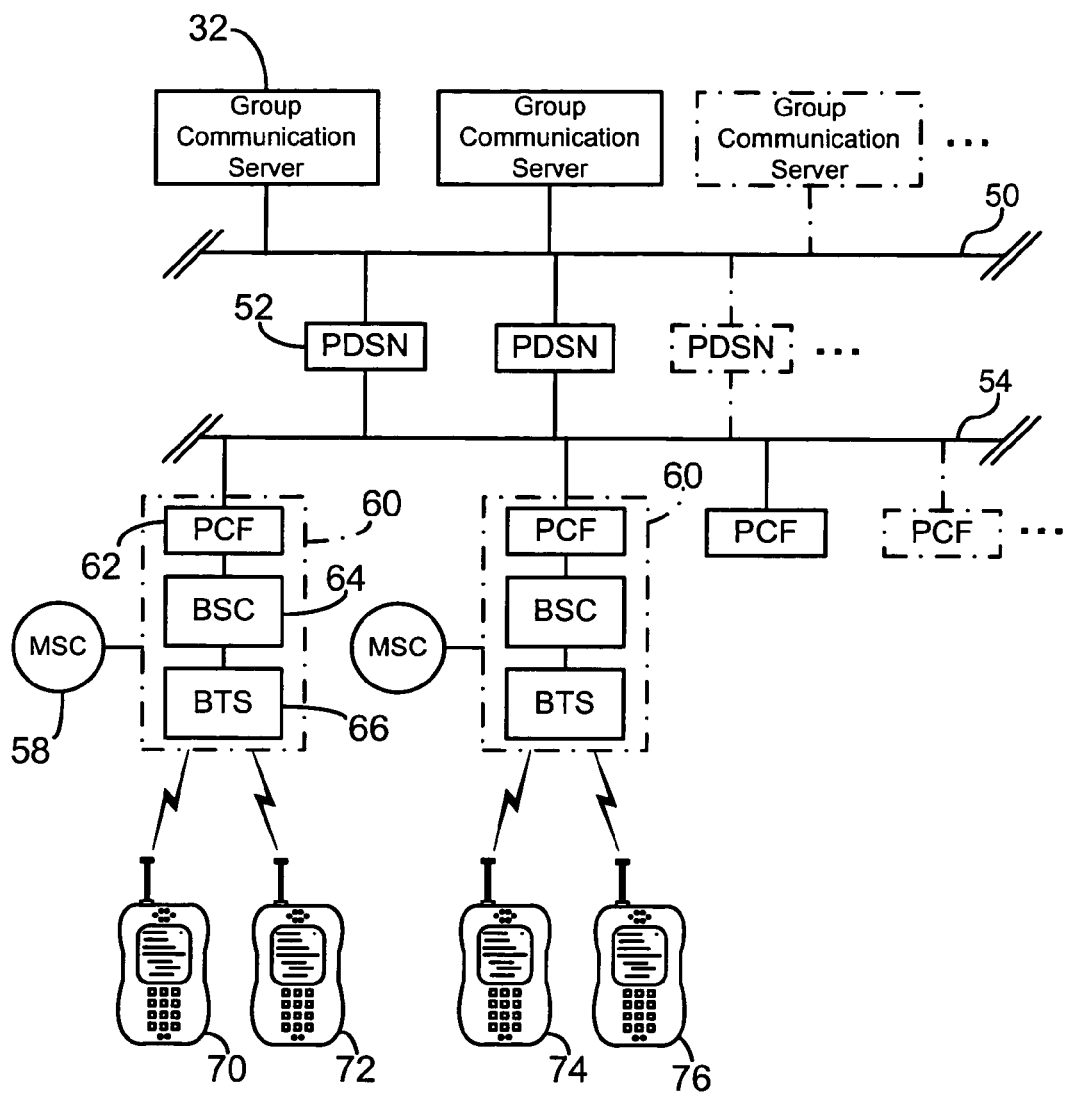
FIG. 2 is a representative diagram of one embodiment of a wireless network in a common cellular telecommunication configuration, having a series of group communication servers control communications between the wireless telecommunication devices of PTT group members.

There are typically one or more intermittent communication devices that bridge communication streams between the communication server 32 and the group of wireless telecommunication devices (set 12), as is shown in FIG. 2, and the communication server 32 can further determine which member wireless telecommunication devices are able to determine the best mode of communication with the wireless devices 14,16,18. The communication server 32 will then direct the one or more intermittent communication devices to send data packets to those wireless telecommunication devices of the set 12.

FIG. 2 is a representative diagram of one embodiment of a wireless network in a common cellular telecommunication configuration, having a group communication server 32 control communications between the wireless devices of set group members (devices 70,72,74,76) in a PTT system. The wireless network is merely exemplary and can include any system whereby remote modules communicate over-the-air between and among each other and/or between and among components of a wireless network 20, including, without limitation, wireless network carriers and/or servers. A series of group communication servers 32 are connected to a group communication server LAN 50. Wireless telephones can request packet data sessions (such as CDMA) from the group communication server(s) 32 using a data service option.

The group communication server(s) 32 are connected to a wireless service providers packet data service node (PDSN) such as PSDN 52, shown here resident on a carrier network 54. Each PSDN 52 can interface with a base station controller (BSC) 64 of a base station 60 through a packet control function (PCF) 62. The PCF 62 is typically located in the base station 60. The carrier network 54 controls messages (generally in the form of data packets) sent to a messaging service controller ("MSC") 58. The carrier network 30 communicates with the MSC 58 by a network, the Internet and/or POTS ("plain ordinary telephone system"). Typically, the network or Internet connection between the carrier network 54 and the MSC 58 transfers data, and the POTS transfers voice information. The MSC 58 can be connected to one or more base stations 60. In a similar manner to the carrier network, the MSC 58 is typically connected to the branch-to-source (BTS) 66 by both the network and/or Internet for data transfer and POTS for voice information. The BTS 66 ultimately broadcasts and receives messages wirelessly to and from the wireless devices, such as cellular telephones 70,72, 74,76, by short messaging service ("SMS"), or other over-the-air methods known in the art.

In wireless devices that have designated a set 12 of group members, the wireless device can directly connect with the other member of the set and engage in voice and data communication. However, all such direct communications will occur through, or at the control of, the group communication server 32. All data packets of the devices do not necessarily have to travel through the group communication server 32 itself, but the server 32 must be able to ultimately control the communication because it will typically be the only server-side LAN 30 component that is aware of and/or can retrieve the identity of the members of the set 12, or direct the identity of the members of the set 12 to another computer device.

In a PTT embodiment, the wireless system 10 allows a dispatch voice service that operates over standard commercial wireless infrastructure (CDMA, FDMA, GSM, etc.). In a dispatch model, communication between endpoints (wireless devices 14,16,18) occurs within virtual groups, wherein the voice of one "talker" is broadcast to one or more "listeners". A single instance of this type of communication is commonly referred to as a "dispatch call." A call is an instantiation of a "group," which defines the characteristics of a call. A group in essence is defined by a member list and associated information, such as group name or group ID. In the absence of a wireless multicast channel, each group is formed by the combination of separate point-to-point connections between each endpoint and group communication server(s) 32 assigned to manage the call.

Each region of the PTT infrastructure is deployed over a specific portion of the carrier packet data network. The group communication server(s) 32 within the region may be routing traffic between one or more PDSNs 52 in the carrier network 54. A "direct call" is a call in which there are only two members, a call originator and a call target, that still use the PTT at system. For this call type, the most challenging scenario for meeting performance requirements is the case when the direct call is placed with both the originator and target handset have dormant packet-data connections, i.e. the wireless devices 14,16,18 do not have an open dedicated channel. Conversely, the originator's and/or the target's packet-data connection can be in the active state and dedicated traffic channels are available at the time the direct call is placed. The call-to-dormant scenario is the one that provides the greatest challenge in meeting performance requirements and preventing significant latency in call set up, as it more fully described herein.

Figure 3:
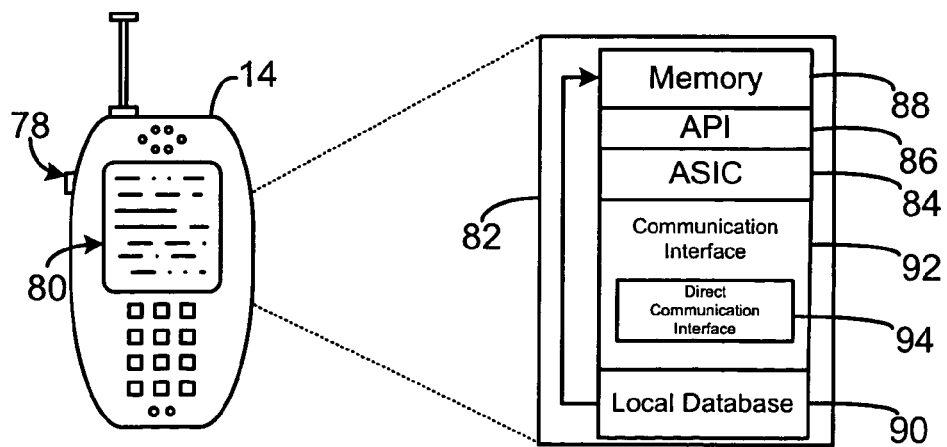
FIG. 3 is a block diagram illustrating the computer platform of the wireless telecommunication device with PTT capability.

FIG. 3 is a block diagram illustrating one embodiment of the wireless telecommunication device being a cellular telephone 14 with a PTT button 78 that opens the direct communication to the target set 12 of devices. The wireless device 14 is also shown as having a graphics display 80 to the user of the wireless device 14. The wireless device 14 includes a computer platform 82 that can handle voice and data packets, and receive and execute software applications transmitted across the wireless network 20. The computer platform 80 includes, among other components, an application-specific integrated circuit ("ASIC") 84, or other processor, microprocessor, logic circuit, programmable gate array, or other data processing device. The ASIC 84 is installed at the time of manufacture of the wireless device and is not normally upgradeable. The ASIC 84 or other processor executes an application programming interface ("API") layer 86, which includes the resident application environment, and can include the operating system loaded on the ASIC 84. The resident application environment interfaces with any resident programs in the memory 88 of the wireless device. An example of a resident application environment is the "binary runtime environment for wireless" (BREW) software developed by Qualcomm® for wireless device platforms.

As shown here, the wireless device can be a cellular telephone 14, with a graphics display, but can also be any wireless device with a computer platform as known in the art, such as a personal digital assistant (PDA), a pager with a graphics display, or even a separate computer platform that has a wireless communication portal, and may otherwise have a wired connection to a network or the Internet. Further, the memory 88 can be comprised of read-only or random-access memory (RAM and ROM), EPROM, EEPROM, flash cards, or any memory common to computer platforms. The computer platform 82 can also include a local database 90 for storage of software applications not actively used in memory 88. The local database 90 is typically comprised of one or more flash memory cells, but can be any secondary or tertiary storage device as known in the art, such as magnetic media, EPROM, EEPROM, optical media, tape, or soft or hard disk. The wireless telephone typically will open a full duplex channel for telecommunication, and in some instances, will communicate via a half-duplex channel, only being able to talk or receive a voice stream.

In this embodiment of the wireless device 14, the computer platform 82 also includes a communication interface 92 that includes a direct communication interface 94 that can open the direct communication channel from the wireless device. The direct communication interface 94 can also be part of the standard communication interface for the wireless device which ordinarily carries the voice and data transmitted to and from the wireless device. The direct communication interface 92 typically is comprised of hardware as is known in the art.

Figure 4:
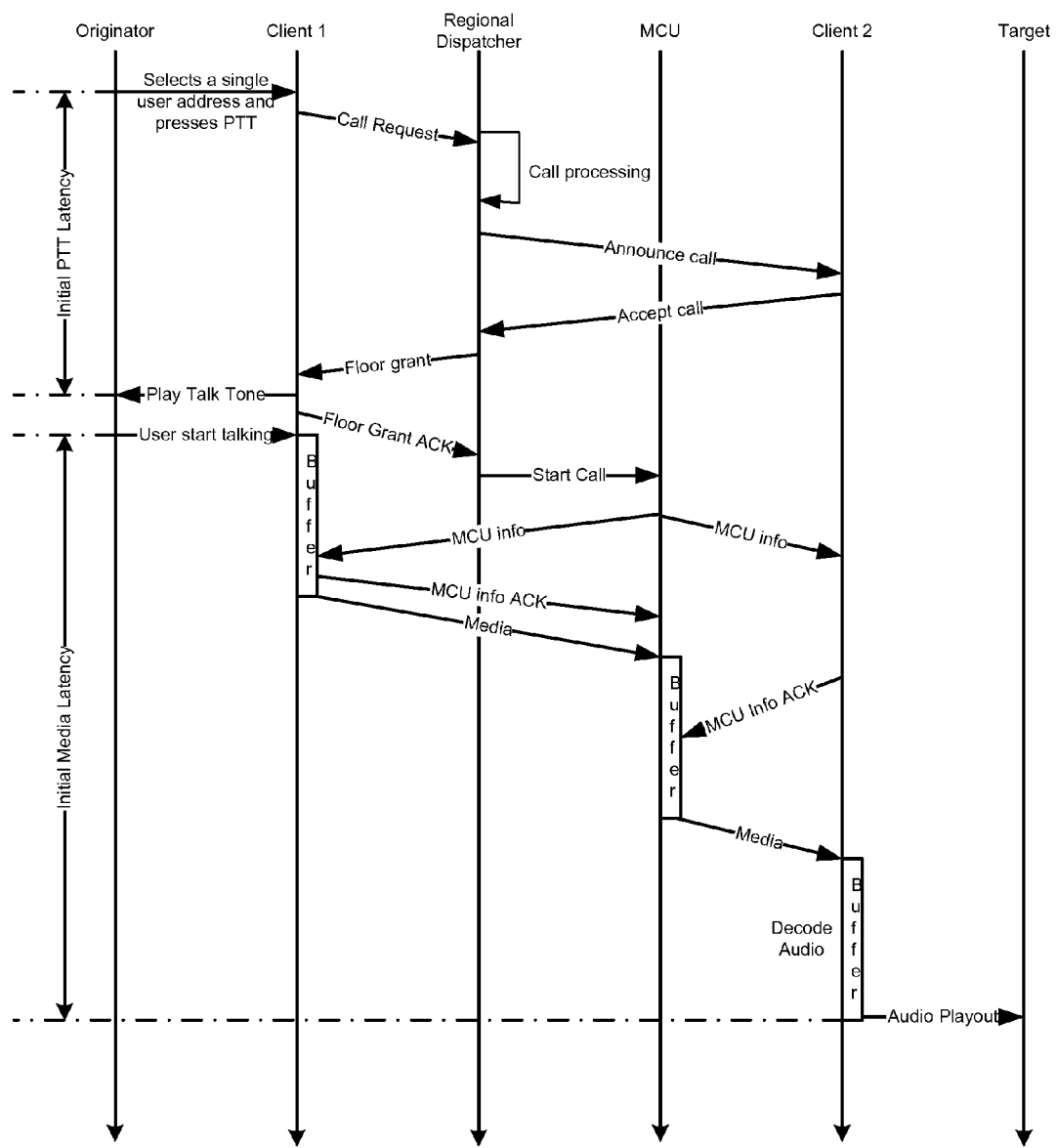
FIG. 4 is a call-progress diagram for application-layer signaling for establishing a PTT communication.

FIG. 4 is a call-progress diagram for application-layer signaling for establishing a PTT communication. It should be noted that call setup signaling can occur via a formal broadcast channel, as opposed to just a generic shared forward link channel such as the Control Channel. For example, in one extant telecommunications system, the system uses a Control Channel (CC) and a separate Broadcast Channel (BCH). The critical performance metrics for direct calls include an initial PTT latency (as shown) where a delay is realized between the time the user presses the PTT button and the time the user is notified (via either an audio or visual means) that the user is granted permission to speak. There is also an initial media latency (as shown) comprised of a delay that is realized between the time the originator starts speaking following the floor grant after the call is first established until to the time the target hears the originator's speech.

The application-layer signaling shown in FIG. 4 for establishing a direct call illustrates the application-layer messaging that is exchanged to establish a direct PTT call. The diagram of FIG. 4 does not identify any physical-layer signaling mechanisms as this system can be implemented on a variety of different physical systems.

Figure 5:
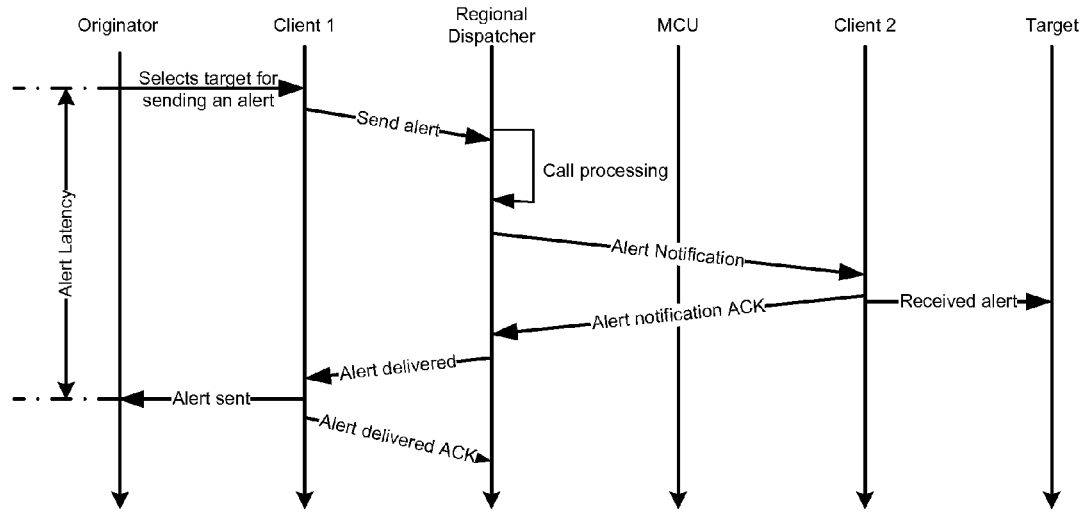
FIG. 5 is a call-progress diagram for application-layer signaling for establishing an alert.

FIG. 5 is a call-progress diagram for application-layer signaling for establishing an alert. An "alert: is a call type that provides a mechanism by which a user notifies another user of a desire to communicate in a direct PTT call. An alert call is completed after a few short application-layer messages are exchanged at the originator, the group communication server 32 and the target wireless device 14,16,18. As described for direct call types, the most challenging scenario for meeting performance requirements for alerts is also when the alert is sent and both the originator and target handset have dormant packet-data connections, i.e. no active dedicated channels. Thus, the alert latency (as shown) is the delay from the time the user presses the PTT button 78 to when the user is notified (via either an audio or visual means), indicating the status of the alert delivery. An alert can be established at the physical-layer so this diagram does not identify any physical-layer signaling mechanisms.

Figure 6:
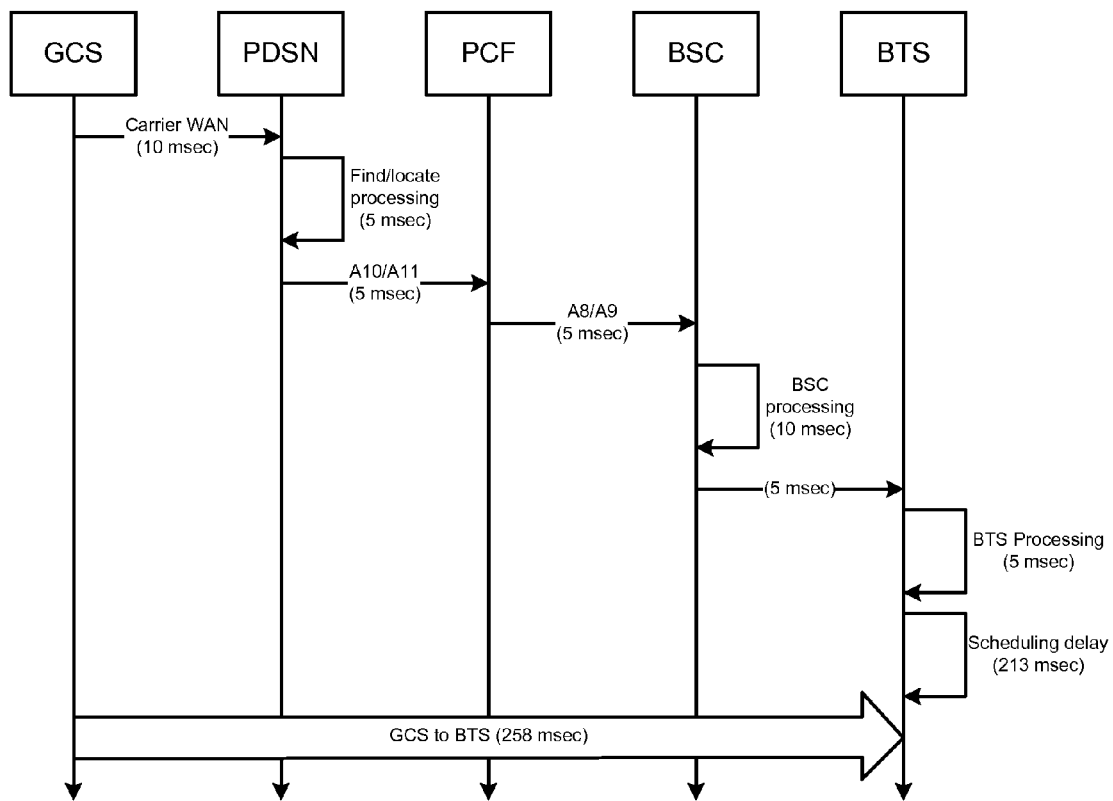
FIG. 6 is a call progress diagram illustrating start and end points to measure traffic channel setup performance.

FIG. 6 is a call progress diagram illustrating start and end points to measure traffic channel (TCH) setup performance. The traffic channel setup time increases as the number of frames in the access probe increases. As shown, the access probe sent by the AT always supplies a request for a dedicated channel, here a "ConnectionRequest," and RouteUpdate message, but it can also supply data over the control or signaling channel, here the "DataOverSignaling" message, to carry application-layer data. The size of the access probe can vary due to the number of hops being reported in the RouteUpdate message, the size of the ConnectionRequest, and the number of bytes sent in the DataOverSignaling message. For purposes of FIG. 6, the AT is able to decode the data on a control channel early, whereas the extreme case is when the AT requires all allotted time of data flow to decode data. In general, the average traffic channel setup performance number should fall well within these two numbers. On average, the early control channel can decode at 38.4 kbps at an effective rate of 153 kbps on the forward link, and the expected traffic channel setup performance is the same with a Control Channel operating at a higher rate of 76.8 kbps. However, performance improves with a faster control channel if less ideal channel conditions exist.

The start of traffic channel setup is measured when the AT begins local access procedures to transmit a probe on the access channel. These procedures include waiting for the start of the access channel cycle, performing the persistence test (probability that a dedicated channel will be opened) and transmitting. The end of the traffic channel setup procedure is measured when the AT receives an acknowledgement (RT-CAck) message.

Figure 7:
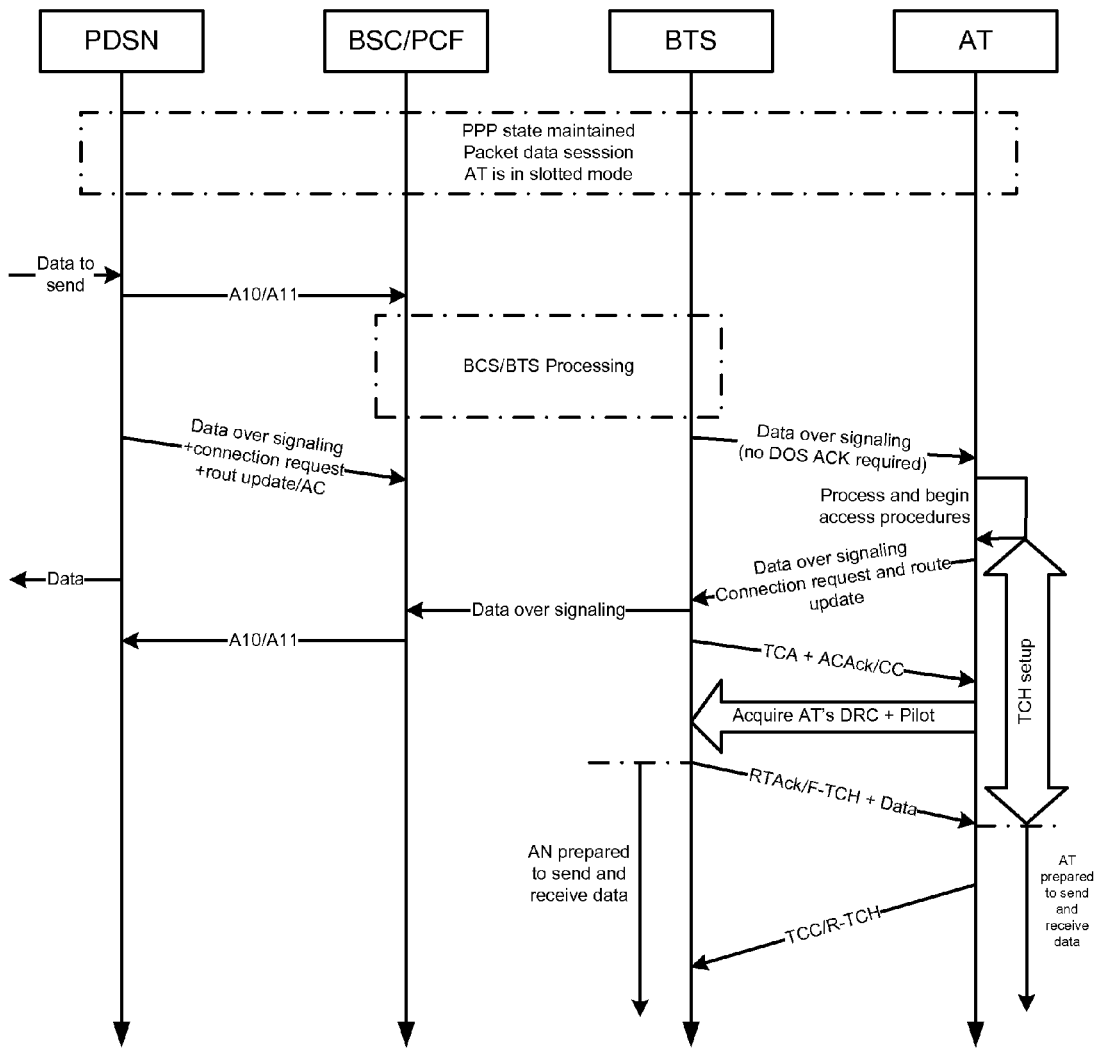
FIG. 7 is a call progress diagram that illustrates possible delays between individual components in setting up the PTT communication with the target wireless telecommunication device.

FIG. 7 is a call progress diagram that illustrates possible delays between individual components in setting up the PTT communication with the target wireless telecommunication device. For AT-terminated data delivery when the AT is in slotted-mode of operation, i.e. being synchronously paged in a "slot," there is a delay for any signaling message (e.g. Page, RouteUpdateRequest or DOS) sent to an AT in slotted-mode. The start of the delay for data delivery to a slotted AT is when the group communication server 32 places data for transmission (on-the-wire) to the AT on the network carrier. The end of the paging delay is when the signaling message (initial message such as the Page, RouteUpdateRequest or DOS) message has been transmitted by the BTS 66.

FIG. 8 is a call progress diagram illustrating the direct transmission of the data in a "DataOverSignaling" message over the control channel to a target wireless device (AT). In implementing this embodiment, if the group communication server 32 (AN) chooses to send the DOS message to all BTS 66 sectors under the BSC's 64 authority, there is an associated cost to the control channel capacity. If this cost is acceptable, no additional mechanisms are required to support the call flow illustrated in FIG. 8. As shown in FIG. 8, the server sends a DOS message to an AT that is in continuous mode of operation and does not have a dedicated traffic access channel. There are several examples where the AN is aware that the AT is in the continuous mode of operation but does not have a traffic channel. The first is where the AN receives any transmission from the AT on the access channel. In such case, the AN knows that AT will remain in continuous mode for a period of time thereafter, such as 1 second. A second case is where the AT holds open the control channel when releasing its traffic channel. When the AT is in suspended/dormant mode of operation it continues to monitor the control channel continuously for a period of time before proceeding to operate in the slotted mode, with periodic synchronous contact to the BTS 66. When the AN is aware that the AT is still monitoring the control channel, the AN can deliver group communication setup data via DOS to the AT directly without incurring a scheduling delay for the paging cycle. The DOS message is sent to the AT in the first opportunity of either a synchronous or asynchronous control channel packet.

Figure 9:
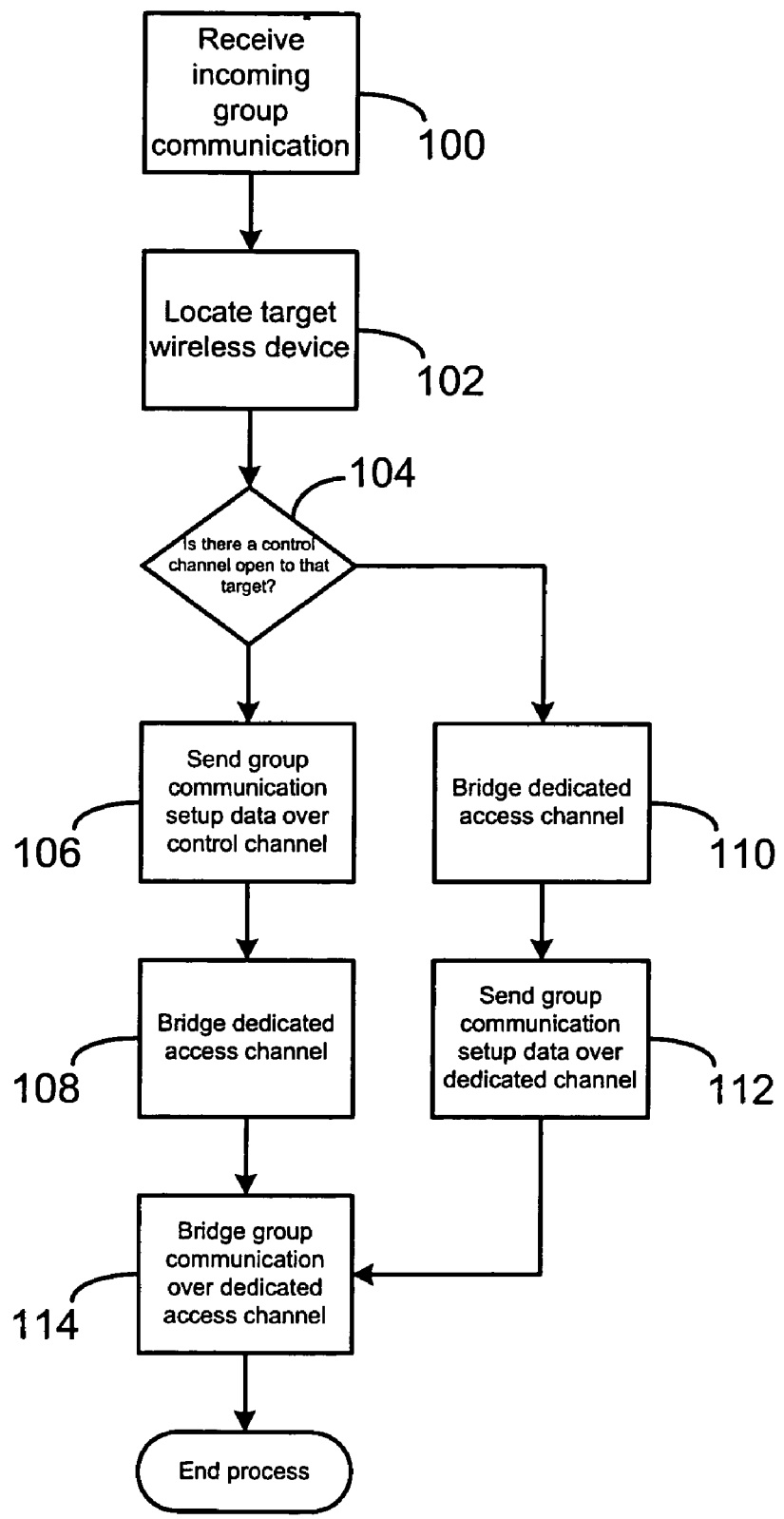
FIG. 9 is a flowchart of one embodiment of the process executing on the group communication server to send group communication setup data to the target wireless telecommunication device if a synchronous/asynchronous control channel is present.

FIG. 9 is a flowchart of one embodiment of the process executing on the group communication server 32 to send group communication setup data to the target wireless telecommunication device 14,16,18, if a synchronous/asynchronous control channel is present. The group communication sever 32 receives the incoming group communication, as shown at step 100, and then target wireless device 14,16,18 is located, as shown at step 102. A determination is then made as to whether there is a control channel open to the target wireless devices, as shown by decision 104. If there is a control channel open to the target wireless device 14,16,18 at decision 104, then the group communication setup data is sent to the target wireless device over the control channel, as shown at step 106, and then a dedicated access/traffic channel is bridged to the target wireless device, as shown at step 108, and then the group communication (e.g. a PTT call) is bridged to the target wireless device over a dedicated access/traffic channel, as shown at step 114, and the process terminates.

Otherwise, if there is no open control channel to the target wireless device 14,16,18 at decision 104, then a dedicated access channel is bridged to the target wireless device, as shown at step 100, and the group communication setup data is send to the target wireless device 14,16,18 over the open dedicated channel. It should be noted that alternatively to bridging a dedicated access channel at decision 104 if the control channel is not available, if the system 10 is embodied with a synchronous paging cycle, the group communication server 32 can wait until the next page to send the group communication setup data. Thus, after the group communication setup data is send at step 112, then the group communication (e.g. a PTT call) is bridged to the target wireless device 14,16,18 over a dedicated access/traffic channel, as shown at step 114, and the process terminates.

It can thus be seen that the system 10 provides a method for signaling and delivering data across a wireless telecommunication network 20 from a communication server 32 including the steps of bridging a control channel between the communication server 32 and at least one dormant wireless telecommunication device 14,16,18, then periodically paging each of the dormant wireless telecommunication devices from the group communication server 32, and upon desiring to open a dedicated broadcast channel to the dormant wireless telecommunication device 14,16,18 for a direct group communication to that wireless telecommunication device 14,16,18, the communication server 32 sending at least group communication setup data across the control channel to the dormant wireless communication device 14,6,18 prior to bridging a dedicated communication channel to that wireless telecommunication device 14,16,18.

The step of sending group communication setup data should be the only data of the group communication to be sent across the control channel. Further, the step of sending group communication setup data to one or more of the set 12 of wireless telecommunication devices across the control channel should occur prior to opening of a dedicated communication channel. The method can further including the step of the communication server 32 selectively sending group communication setup data to one or more of the set 12 of wireless telecommunication devices across the control channel while sending group communication setup data to other wireless telecommunication devices 14,16,18 through the next periodic page or other control channel bridging. Also, the step of bridging a control channel can be bridging an asynchronous control channel or synchronous control channel.

The system 10 also includes an inventive communication server 32 that maintains communication with a plurality of wireless telecommunication devices 14,16,18 wherein a set 12 of the wireless telecommunication devices are able to direct a single group communication stream to other members of the set 12, noting that each of the set 12 of wireless telecommunication devices have a dormant state in which the wireless telecommunication device 14,16,18 bridges at least one continuous control channel with the communication server 32 and an active state in which the wireless telecommunication device 14,16,18 bridges one or more dedicated communication channels with the communication server 32. In one embodiment, the communication server 32 periodically pages each dormant wireless telecommunication device of the plurality of wireless telecommunication devices and sends group communication setup data for incoming group communications to each member of the set 12 of wireless telecommunication devices either over a control channel to dedicated access/traffic channel, as shown in FIG. 9. Upon desiring to open a dedicated broadcast channel to a dormant wireless telecommunication device 14,16,18 for a direct group communication, the communication server 32 sending at least group communication setup data across the control channel to the dormant wireless communication device 14,16,18 prior to bridging a dedicated communication channel to that wireless telecommunication device 14,16,18.

Another embodiment includes a program resident in a computer readable medium, where the program directs a communication server 32 to perform the inventive steps of the method. The computer readable medium can be the memory of the computer of the group communication server 32, or can be in an accessible database, such as database 34. Further, the computer readable medium can be in a secondary storage media that is loadable onto a computer platform, such as a magnetic disk or tape, optical disk, hard disk, flash memory, or other storage media as is known in the art.

In the context of FIG. 9, the method may be implemented, for example, by operating portion(s) of the wireless network 20 to execute a sequence of machine-readable instructions, such as the communication server 32. The instructions can reside in various types of signal-bearing or data storage primary, secondary, or tertiary media. The media may comprise, for example, RAM (not shown) accessible by, or residing within, the components of the wireless network 20. Whether contained in RAM, a diskette, or other secondary storage media, the instructions may be stored on a variety of machine-readable data storage media, such as DASD storage (e.g., a conventional "hard drive" or a RAID array), magnetic tape, electronic read-only memory (e.g., ROM, EPROM, or EEPROM), flash memory cards, an optical storage device (e.g. CD-ROM, WORM, DVD, digital optical tape), paper "punch" cards, or other suitable data storage media including digital and analog transmission media.

While the foregoing disclosure shows illustrative embodiments of the invention, it should be noted that various changes and modifications could be made herein without departing from the scope of the invention as defined by the appended claims. Furthermore, although elements of the invention may be described or claimed in the singular, the plural is contemplated unless limitation to the singular is explicitly stated.

What is claimed is:

1. A system for signaling and delivering data to a wireless telecommunication device on a wireless communication network, comprising:

a wireless telecommunication device of a plurality of wireless telecommunication devices, wherein each wireless telecommunication device is able to direct a single group communication stream to a designated group of the plurality of wireless telecommunication devices, each wireless telecommunication device having a dormant state in which a wireless telecommunication device in the dormant state bridges at least one continuous control channel with a group communication server, and an active state in which a wireless telecommunication device in the active state bridges one or more dedicated communication channels with the group communication server, each wireless telecommunication device further receiving group communication setup data for incoming group communications to the wireless telecommunication device; and wherein the group communication server maintains communication with each of the plurality of wireless telecommunication devices through the at least one continuous control channel, and the group communication server periodically pages each dormant wireless telecommunication device of the plurality of wireless telecommunication devices to selectively bridge the one or more dedicated communication channel, wherein upon desiring to open one or more dedicated communication channels to at least one of each wireless telecommunication device for a direct group communication, the group communication server sends at least group communication setup data across the at least one continuous control channel to at least one of each dormant wireless communication device of the plurality of wireless telecommunication devices prior to bridging one or more dedicated communication channels to at least one of the plurality of wireless telecommunication devices.

2. The system of claim 1, wherein the group communication server sends only group communication setup data across the at least one continuous control channel for the group communication.

3. The system of claim 1, wherein the group communication server can selectively send group communication setup data to one or more of the plurality of wireless telecommunication devices across the at least one continuous control channel while sending group communication setup data to other wireless telecommunication devices through a periodic page.

4. The system of claim 1, wherein at least one continuous control channel is an asynchronous control channel.

5. The system of claim 1, wherein at least one continuous control channel is a synchronous control channel.

6. A system for signaling and delivering data to a wireless telecommunication device on a wireless network, comprising:

a wireless telecommunication device of a plurality of wireless telecommunication devices, wherein each wireless telecommunication device is able to direct a single group communication stream to other members of the set of the plurality of wireless telecommunication devices, each wireless telecommunication device having a dormant state in which a wireless telecommunication device in the dormant state bridges at least one broadcast channel with a group communication server, and an active state in which a wireless telecommunication device in the active state bridges one or more dedicated communication channels with the group communication server, wherein the group communication server maintains communication with each wireless telecommunication device through the at least one broadcast channel, periodically pages each dormant wireless telecommunication device of the plurality of wireless telecommunication devices, and sends group communication setup data for incoming group communications to each of the set of wireless telecommunication devices, and wherein upon desiring to open one or more dedicated communication channels to at least one dormant wireless telecommunication device for direct group communication, the group communication server sends at least group means for sending at least group communication setup data across the bridged continuous control channel to each dormant wireless communication device prior to bridging a dedicated communication channel to at least one of the plurality of wireless telecommunication devices.

7. The system of claim 6, wherein the group communication server sends group communication setup data only across the broadcast channel.

8. The system of claim 6, wherein the group communication server can selectively send group communication setup data to one or more of the plurality of wireless telecommunication devices across the broadcast channel while sending group communication setup data to other wireless telecommunication devices through a periodic page.

9. A group communication server that maintains communication with a plurality of wireless telecommunication devices, wherein each wireless telecommunication device is able to direct a single group communication stream to other members of the plurality of wireless telecommunication devices, each wireless telecommunication devices having a dormant state in which the wireless telecommunication device bridges at least one continuous control channel with the group communication server and an active state in which a wireless telecommunication device in the active state bridges one or more dedicated communication channels with the group communication server, the group communication server comprising:

means for periodically paging each dormant wireless telecommunication device of the plurality of wireless telecommunication devices;

means for receiving a group communication request at the group communication server indicating a desire to open the dedicated communication channel; and means for sending at least group communication setup data across the bridged continuous control channel to each dormant wireless communication device prior to bridging a dedicated communication channel to at least one of the plurality of wireless telecommunication devices.

10. The group communication server of claim 9, further comprising:

means for sending only group communication setup data across the at least one continuous control channel.

11. The group communication server of claim 9, further comprising:

means for selectively sending, from the group communication server, group communication setup data across the at least one continuous control channel through more than one periodic page.

12. The group communication server of claim 9, wherein at least one continuous control channel is bridging an asynchronous control channel.

13. The group communication server of claim 9, where at least one continuous control channel is bridging a synchronous control channel.

14. A method for communicating data across a wireless group communication network comprising a plurality of wireless telecommunications devices from a group communication server, wherein each wireless telecommunication device is able to direct a single group communication stream to other members of the plurality of wireless telecommunication devices, each wireless telecommunication devices having a dormant state in which the wireless telecommunication device bridges at least one continuous control channel with the group communication server and an active state in which a wireless telecommunication device in the active state bridges one or more dedicated communication channels with the group communication server, comprising:

bridging a continuous control channel from the group communication server;

periodically transmitting a page from the group communication server to selectively bridge a dedicated communication channel;

receiving a group communication stream at the group communication server indicating a desire to open the dedicated communication channel; and sending from the group communication server at least group communication setup data across the bridged continuous control channel prior to bridging the dedicated communication channel.

15. The method of claim 14, further comprising:

sending only group communication setup data across the at least one continuous control channel.

16. The method of claim 14, further comprising:

selectively sending, from the group communication server, group communication setup data across the at least one continuous control channel through more than one periodic page.

17. The method of claim 14, wherein at least one continuous control channel is bridging an asynchronous control channel.

18. The method of claim 14, wherein at least one continuous control channel is bridging a synchronous control channel.

19. A method for communicating data across a wireless group communication network comprising a plurality of wireless telecommunications devices from a group communication server, wherein each wireless telecommunication device is able to direct a single group communication stream to other members of the plurality of wireless telecommunication devices, each wireless telecommunication devices having a dormant state in which the wireless telecommunication device bridges at least one broadcast control channel with the group communication server and an active state in which a wireless telecommunication device in the active state bridges one or more dedicated communication channels with the group communication server, comprising:

bridging a broadcast channel from the group communication server;

periodically transmitting a page from the group communication server to selectively bridge a dedicated communication channel;

receiving a group communication stream at the group communication server indicating a desire to open the dedicated broadcast channel; and sending from the group communication server at least group communication setup data across the bridged broadcast channel prior to bridging the dedicated communication channel.

20. The method of claim 19, further comprising:

sending only group communication setup data across the at least one continuous control channel.

21. The method of claim 19, further comprising:

selectively sending, from the group communication server, group communication setup data across the at least one continuous control channel through more than one periodic page.

22. A non-transitory computer-readable medium including machine-readable instructions stored thereon for communicating data across a wireless group communication network comprising a plurality of wireless telecommunications devices from a group communication server, wherein each wireless telecommunication device is able to direct a single group communication stream to other members of the plurality of wireless telecommunication devices, each wireless telecommunication devices having a dormant state in which the wireless telecommunication device bridges at least one continuous control channel with the group communication server and an active state in which a wireless telecommunication device in the active state bridges one or more dedicated communication channels with the group communication server, comprising:

machine-readable instructions that maintain communication with each of a plurality of wireless telecommunication devices;

machine-readable instructions that periodically page each dormant wireless telecommunication device of the plurality of wireless telecommunication devices to selectively bridge a dedicated communication channel;

machine-readable instructions that provide each wireless telecommunication device ability to direct a single group communication stream to a designated group of the plurality of wireless telecommunication devices;

machine-readable instructions that bridge at least one of a continuous control channel between a group communication server and at least one dormant wireless telecommunication device;

machine-readable instructions that periodically page each of a plurality of dormant wireless telecommunication devices from the group communication server;

machine-readable instructions that open a dedicated communication channel to each dormant wireless telecommunication device for a direct group communication; and machine-readable instructions that send at least group communication setup data across the at least one continuous control channel to at least one of each of the dormant wireless communication device prior to bridging one or more dedicated communication channels to at least one of the plurality of wireless telecommunication devices.

23. The computer-readable medium of claim 22, wherein the machine-readable instructions that send group communication setup data send only group communication setup data of the group communication across the at least one continuous control channel.

24. The computer readable medium of claim 22, wherein the machine-readable instructions further comprise:
machine-readable instructions that send group communication setup data to one or more of the plurality of wireless telecommunication devices across the at least one continuous control channel while sending group communication setup data to other wireless telecommunication devices through a periodic page.

25. The computer readable medium of claim 21, wherein at least one continuous control channel is an asynchronous control channel.

26. The computer-readable medium of claim 22, wherein at least one continuous control channel is a synchronous control channel.

27. The computer-readable medium of claim 22, wherein at least one continuous control channel is bridging an asynchronous control channel.

28. The computer-readable medium of claim 22, wherein at least one continuous control channel is bridging a synchronous control channel.

29. A group communication server for communication data across a wireless group communication network comprising a plurality of wireless telecommunications devices from a group communication server, wherein
each wireless telecommunication device is able to direct a single group communication stream to other members of the plurality of wireless telecommunication devices, each wireless telecommunication devices having a dormant state in which the wireless telecommunication device bridges at least one continuous control channel with the group communication server and an active state in which a wireless telecommunication device in the active state bridges one or more dedicated communication channels with the group communication server, comprising:
a processor;
a memory interacting with said processor, said memory comprising instructions that, when executed by said processor, cause said processor to perform operations comprising:
bridging a continuous control channel from the group communication server;
transmitting a page from the group communication server to selectively bridge a dedicated communication channel;
receiving a group communication stream at the group communication server indicating a desire to open the dedicated communication channel; and
sending from the group communication server at least group communication setup data across the bridged continuous control channel prior to bridging the dedicated communication channel.

30. The group communication server of claim 29, wherein said memory further comprises instructions that, when executed by said processor, cause said processor to perform operations comprising:
sending only group communication setup data across the at least one continuous control channel.

31. The group communication server of claim 29 comprising instructions that, when executed by said processor, cause said processor to perform operations comprising:
selectively sending, from the group communication server, group communication setup data across the at least one continuous control channel through more than one periodic page.

32. The group communication server of claim 29, wherein at least one continuous control channel is bridging an asynchronous control channel.

33. The group communication server of claim 29, wherein at least one continuous control channel is bridging a synchronous control channel.

34. A method for signaling and delivering data to a wireless telecommunication device on a wireless communication network, comprising:
directing, by a wireless telecommunication device of a plurality of wireless telecommunication devices, a single group communication stream to a designated group of the plurality of wireless telecommunication devices, each wireless telecommunication device having a dormant state in which a wireless telecommunication device in the dormant state bridges at least one continuous control channel with a group communication server, and an active state in which a wireless telecommunication device in the active state bridges one or more dedicated communication channels with the group communication server, each wireless telecommunication device further receiving group communication setup data for incoming group communications to the wireless telecommunication device; and
wherein the group communication server maintains communication with each of the plurality of wireless telecommunication devices through the at least one continuous control channel, and the group communication server periodically pages each dormant wireless telecommunication device of the plurality of wireless telecommunication devices to selectively bridge the one or more dedicated communication channel,
wherein upon desiring to open one or more dedicated communication channels to at least one of each wireless telecommunication device for a direct group communication, the group communication server sends at least group communication setup data across the at least one continuous control channel to at least one of each dormant wireless communication device of the plurality of wireless telecommunication devices prior to bridging one or more dedicated communication channels to at least one of the plurality of wireless telecommunication devices.

35. The method of claim 34, wherein the group communication server sends only group communication setup data across the at least one continuous control channel for the group communication.

36. The method of claim 34, wherein the group communication server can selectively send group communication setup data to one or more of the plurality of wireless telecommunication devices across the at least one continuous control channel while sending group communication setup data to other wireless telecommunication devices through a periodic page.

37. The method of claim 34, wherein at least one continuous control channel is an asynchronous control channel.

38. The method of claim 34, wherein at least one continuous control channel is a synchronous control channel.

39. A system for signaling and delivering data to a wireless telecommunication device on a wireless communication network, comprising:

means for directing, by a wireless telecommunication device of a plurality of wireless telecommunication devices, a single group communication stream to a designated group of the plurality of wireless telecommunication devices, each wireless telecommunication device having a dormant state in which a wireless telecommunication device in the dormant state bridges at least one continuous control channel with a group communication server, and an active state in which a wireless telecommunication device in the active state bridges one or more dedicated communication channels with the group communication server, each wireless telecommunication device further receiving group communication setup data for incoming group communications to the wireless telecommunication device; and wherein the group communication server maintains communication with each of the plurality of wireless telecommunication devices through the at least one continuous control channel, and the group communication server periodically pages each dormant wireless telecommunication device of the plurality of wireless telecommunication devices to selectively bridge the one or more dedicated communication channel, wherein upon desiring to open one or more dedicated communication channels to at least one of each wireless telecommunication device for a direct group communication, the group communication server sends at least group communication setup data across the at least one continuous control channel to at least one of each dormant wireless communication device of the plurality of wireless telecommunication devices prior to bridging one or more dedicated communication channels to at least one of the plurality of wireless telecommunication devices.

40. The system of claim 39, wherein the group communication server sends only group communication setup data across the at least one continuous control channel for the group communication.

41. The system of claim 39, wherein the group communication server can selectively send group communication setup data to one or more of the plurality of wireless telecommunication devices across the at least one continuous control channel while sending group communication setup data to other wireless telecommunication devices through a periodic page.

42. The system of claim 39, wherein at least one continuous control channel is an asynchronous control channel.

43. The system of claim 39, wherein at least one continuous control channel is a synchronous control channel.

44. A method for signaling and delivering data to a wireless telecommunication device on a wireless communication network, comprising:

directing, by a wireless telecommunication device of a plurality of wireless telecommunication devices, a single group communication stream to a designated group of the plurality of wireless telecommunication devices, each wireless telecommunication device having a dormant state in which a wireless telecommunication device in the dormant state bridges at least one broadcast channel with a group communication server, and an active state in which a wireless telecommunication device in the active state bridges one or more dedicated communication channels with the group communication server, each wireless telecommunication device further receiving group communication setup data for incoming group communications to the wireless telecommunication device; and wherein the group communication server maintains communication with each of the plurality of wireless telecommunication devices through the at least one broadcast channel, and the group communication server periodically pages each dormant wireless telecommunication device of the plurality of wireless telecommunication devices to selectively bridge the one or more dedicated communication channel, wherein upon desiring to open one or more dedicated communication channels to at least one of each wireless telecommunication device for a direct group communication, the group communication server sends at least group communication setup data across the at least one broadcast channel to at least one of each dormant wireless communication device of the plurality of wireless telecommunication devices prior to bridging one or more dedicated communication channels to at least one of the plurality of wireless telecommunication devices.

45. The method of claim 44, wherein the group communication server sends only group communication setup data across the at least one broadcast channel for the group communication.

46. The method of claim 44, wherein the group communication server can selectively send group communication setup data to one or more of the plurality of wireless telecommunication devices across the at least one broadcast channel while sending group communication setup data to other wireless telecommunication devices through a periodic page.

47. A system for signaling and delivering data to a wireless telecommunication device on a wireless communication network, comprising:

means for directing, by a wireless telecommunication device of a plurality of wireless telecommunication devices, a single group communication stream to a designated group of the plurality of wireless telecommunication devices, each wireless telecommunication device having a dormant state in which a wireless telecommunication device in the dormant state bridges at least one broadcast channel with a group communication server, and an active state in which a wireless telecommunication device in the active state bridges one or more dedicated communication channels with the group communication server, each wireless telecommunication device further receiving group communication setup data for incoming group communications to the wireless telecommunication device; and wherein the group communication server maintains communication with each of the plurality of wireless telecommunication devices through the at least one broadcast channel, and the group communication server periodically pages each dormant wireless telecommunication device of the plurality of wireless telecommunication devices to selectively bridge the one or more dedicated communication channel, wherein upon desiring to open one or more dedicated communication channels to at least one of each wireless telecommunication device for a direct group communication, the group communication server sends at least group communication setup data across the at least one broadcast channel to at least one of each dormant wireless communication device of the plurality of wireless telecommunication devices prior to bridging one or more dedicated communication channels to at least one of the plurality of wireless telecommunication devices.

48. The system of claim 47, wherein the group communication server sends only group communication setup data across the at least one broadcast channel for the group communication.

49. The system of claim 47, wherein the group communication server can selectively send group communication setup data to one or more of the plurality of wireless telecommunication devices across the at least one broadcast channel while sending group communication setup data to other wireless telecommunication devices through a periodic page.

50. A group communication server for communicating data across a wireless group communication network comprising a plurality of wireless telecommunications devices from a group communication server, wherein
  each wireless telecommunication device is able to direct a single group communication stream to other members of the plurality of wireless telecommunication devices, each wireless telecommunication devices having a dormant state in which the wireless telecommunication device bridges at least one broadcast channel with the group communication server and an active state in which a wireless telecommunication device in the active state bridges one or more dedicated communication channels with the group communication server, comprising:
  a processor;
  a memory interacting with said processor, said memory comprising instructions that, when executed by said processor, cause said processor to perform operations comprising:
    bridging a broadcast channel from the group communication server;
    transmitting a page from the group communication server to selectively bridge a dedicated communication channel;
    receiving a group communication stream at the group communication server indicating a desire to open the dedicated communication channel; and
    sending from the group communication server at least group communication setup data across the bridged broadcast channel prior to bridging the dedicated communication channel.

51. The group communication server of claim 50, wherein said memory further comprises instructions that, when executed by said processor, cause said processor to perform operations comprising:
  sending only group communication setup data across the at least one broadcast channel.

52. The group communication server of claim 50, comprising instructions that, when executed by said processor, cause said processor to perform operations comprising:
  selectively sending, from the group communication server, group communication setup data across the at least one broadcast channel through more than one periodic page.

53. A computer-readable medium including machine-readable instructions stored thereon for communicating data across a wireless group communication network comprising a plurality of wireless telecommunications devices from a group communication server, wherein
  each wireless telecommunication device is able to direct a single group communication stream to other members of the plurality of wireless telecommunication devices, each wireless telecommunication devices having a dormant state in which the wireless telecommunication device bridges at least one broadcast channel with the group communication server and an active state in which a wireless telecommunication device in the active state bridges one or more dedicated communication channels with the group communication server, comprising:
  machine-readable instructions that maintain communication with each of a plurality of wireless telecommunication devices;
  machine-readable instructions that periodically page each dormant wireless telecommunication device of the plurality of wireless telecommunication devices to selectively bridge a dedicated communication channel;
  machine-readable instructions that provide each wireless telecommunication device ability to direct a single group communication stream to a designated group of the plurality of wireless telecommunication devices;
  machine-readable instructions that bridge at least one of a broadcast channel between a group communication server and at least one dormant wireless telecommunication device;
  machine-readable instructions that periodically page each of a plurality of dormant wireless telecommunication devices from the group communication server;
  machine-readable instructions that open a dedicated communication channel to each dormant wireless telecommunication device for a direct group communication; and
  machine-readable instructions that send at least group communication setup data across the at least one broadcast channel to at least one of each of the dormant wireless communication device prior to bridging one or more dedicated communication channels to at least one of the plurality of wireless telecommunication devices.

54. The computer readable medium of claim 53, wherein the machine-readable instructions that send group communication setup data send only group communication setup data of the group communication across the at least one broadcast channel.

55. The computer readable medium of claim 53, wherein the machine-readable instructions further comprise:
  machine-readable instructions that send group communication setup data to one or more of the plurality of wireless telecommunication devices across the at least one broadcast channel while sending group communication setup data to other wireless telecommunication devices through a periodic page.

56. A group communication server that maintains communication with a plurality of wireless telecommunication devices, wherein
  each wireless telecommunication device is able to direct a single group communication stream to other members of the plurality of wireless telecommunication devices, each wireless telecommunication devices having a dormant state in which the wireless telecommunication device bridges at least one broadcast channel with the group communication server and an active state in which a wireless telecommunication device in the active state bridges one or more dedicated communication channels with the group communication server, the group communication server comprising:

means for periodically paging each dormant wireless telecommunication device of the plurality of wireless telecommunication devices;
means for receiving a group communication request at the group communication server indicating a desire to open the dedicated communication channel; and
means for sending at least group communication setup data across the bridged broadcast channel to each dormant wireless communication device prior to bridging a dedicated communication channel to at least one of the plurality of wireless telecommunication devices.

57. The group communication server of claim 56, further comprising:
  means for sending only group communication setup data across the at least one broadcast channel.

58. The group communication server of claim 56, further comprising:
  means for selectively sending, from the group communication server, group communication setup data across the at least one broadcast channel through more than one periodic page.

* * * * *